United States Patent
Kim et al.

(10) Patent No.: US 11,788,617 B2
(45) Date of Patent: Oct. 17, 2023

(54) SHIFT LEVER APPARATUS FOR VEHICLE

(71) Applicants: Hyundai Motor Company, Seoul (KR); Kia Motors Corporation, Seoul (KR)

(72) Inventors: Min Han Kim, Gyeonggi-do (KR); Yong Lee, Gyeonggi-do (KR); Chang Jin Ji, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 213 days.

(21) Appl. No.: 17/009,320

(22) Filed: Sep. 1, 2020

(65) Prior Publication Data

US 2021/0372518 A1  Dec. 2, 2021

(30) Foreign Application Priority Data

Jun. 1, 2020  (KR) .......................... 10-2020-0065886

(51) Int. Cl.
| | |
|---|---|
| *F16H 59/00* | (2006.01) |
| *F16H 59/10* | (2006.01) |
| *F16H 59/12* | (2006.01) |
| *F16H 61/24* | (2006.01) |
| *F16H 61/22* | (2006.01) |

(52) U.S. Cl.
CPC ........... *F16H 59/105* (2013.01); *F16H 59/12* (2013.01); *F16H 61/22* (2013.01); *F16H 61/24* (2013.01); *F16H 2061/247* (2013.01)

(58) Field of Classification Search
CPC ........ F16H 59/105; F16H 59/12; F16H 61/22; F16H 61/24; F16H 2061/247; F16H 59/0204; F16H 59/0278; B60K 20/02; G05G 1/04
See application file for complete search history.

(56) References Cited

U.S. PATENT DOCUMENTS

| | | | |
|---|---|---|---|
| 6,325,196 B1 * | 12/2001 | Beattie ................ | F16H 59/0204 74/473.18 |
| 6,889,812 B2 * | 5/2005 | Wendeberg ............. | F16H 59/10 192/219.4 |

(Continued)

FOREIGN PATENT DOCUMENTS

| | | |
|---|---|---|
| JP | 5963857 B2 | 8/2016 |
| KR | 101730029 B1 | 5/2017 |

*Primary Examiner* — Victor L MacArthur
(74) *Attorney, Agent, or Firm* — Fox Rothschild LLP (57) ABSTRACT

A shift lever apparatus is normally hidden, and provides traveling sensitivity according to a driver's preference when deployed for a specific mode. The shift lever apparatus includes a shift lever that is deployed or undeployed in a housing according to a rotating location; an operating mechanism installed on the shift lever to be rotated together with the shift lever, and provided with a stopper drawn out or drawn into the operating mechanism depending on whether an operation is performed; a guide installed in the housing to guide movement of the stopper and having a first fixing hole and a second fixing hole spaced apart from each other within a rotating radius of the stopper; and a sensing sensor sensing the rotating location of the shift lever when the stopper is located in the second fixing hole to transfer a shift signal according to the rotating location.

17 Claims, 7 Drawing Sheets

(56) References Cited

U.S. PATENT DOCUMENTS

| | | | |
|---|---|---|---|
| 7,172,063 B2* | 2/2007 | Wendeberg | F16H 59/10 |
| | | | 74/473.26 |
| 8,601,896 B2* | 12/2013 | Skogward | F16H 59/10 |
| | | | 74/473.26 |
| 10,927,946 B2* | 2/2021 | Heo | F16H 59/08 |
| 11,236,818 B2* | 2/2022 | Soave | B60K 20/04 |

* cited by examiner

SHIFT LEVER APPARATUS FOR VEHICLE

CROSS REFERENCE TO RELATED APPLICATION

The present application claims under 35 U.S.C. § 119(a) the benefit of Korean Patent Application No. 10-2020-0065886 filed on Jun. 1, 2020, the entire contents of which are incorporated by reference herein.

BACKGROUND

(a) Technical Field

The present disclosure relates to a shift lever apparatus for a vehicle in which a lever for a specific mode is normally hidden, and the lever is deployed when the specific mode is used according to a user's preference.

(b) Description of the Related Art

Generally, a vehicle is equipped with a transmission which changes a torque between a driving unit and a driving wheel. Accordingly, a driving force is appropriately changed according to a traveling state so that the vehicle travels in an intended manner.

An automatic transmission is configured to shift gears automatically, instead of manually by a driver, in order to select an optimal gear according to a set traveling speed and a degree of depressing an accelerator pedal. The automatic transmission is classified into a P stage for parking, an R stage for reverse, an N stage for neutral, and a D stage for traveling, and configured to determine a specific shift stage by operating a shift lever.

Recently, various types of levers, such as a button type and a dial type, have been utilized as a shift lever, in addition to a conventional lever type, for determining a shift stage. However, it is difficult to operate a manual mode (e.g., a sports mode) when the shift lever is the button type or the dial type. In order to address this problem, a paddle shift is separately mounted, but the paddle shift may require alteration of a handle used as the shift lever (e.g., including for an autonomous vehicle), and typically cannot be applied to regenerative braking in an electric vehicle.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a shift lever apparatus which is simple in appearance (e.g., clean in design) as a lever for a specific mode that is normally hidden, and provides traveling sensitivity according to a driver's preference as the lever is deployed when the specific mode according to the driver's preference is required.

A shift lever apparatus according to the present disclosure for achieving the object includes: a shift lever rotatably installed in a housing, and deployed or undeployed in the housing according to a rotating location; an operating mechanism installed on the shift lever to be rotated together with the shift lever, and provided with a stopper drawn out or drawn into the operating mechanism depending on whether an operation is performed; a guide installed in the housing to guide the movement of the stopper, and formed so that a first fixing hole and a second fixing hole are spaced apart from each other within a rotating radius of the stopper, the first fixing hole being located so that the stopper is inserted when the shift lever is in an undeployed location, and the second fixing hole being located so that the stopper is inserted when the shift lever is in a deployed location; and a sensing sensor sensing the rotating location of the shift lever when the stopper is located in the second fixing hole to transfer a shift signal according to the rotating location.

The guide is disposed at a side of the shift lever, and a sensing sensor is disposed at a side facing the second fixing hole of the guide, so that the stopper is inserted into the first fixing hole or moved adjacently to the sensing sensor through the second fixing hole according to the rotating location of the shift lever.

As the guide is formed so that a peripheral portion of the second fixing hole protrudes toward the sensing sensor, a contact portion of the stopper is formed to be inclined.

The second fixing hole of the guide is formed to accommodate a sensing range of the sensing sensor according to an upshifted or downshifted operation of the shift lever in a state where the stopper is inserted into the second fixing hole.

The operating mechanism is composed of a release button provided on a first end of the shift lever and moved depending on whether the operation is performed; and a release link formed to extend from the first end to a second end of the shift lever and elastically supported within the shift lever, and having one end connected to the release button and another end connected to the stopper, thereby moving the stopper in conjunction with the release button.

The release button is installed to be drawn out from or drawn into the first end of the shift lever, and the release link has one end in contact with the release button and is moved to the second end of the shift lever upon the drawn-into operation of the release button, and draws out the stopper connected to the second end of the shift lever so that the stopper is separated from the first fixing hole or the second fixing hole.

The release button is rotated or slid at the first end of the shift lever to be drawn out or drawn into the shift lever, and the one end of the release link is formed so that a portion in contact with the release button has an inclined surface.

One end of the stopper is provided with a guide pin, and another end of the release link has an extension slit, into which the guide pin is inserted, which extends diagonally toward a drawn-into direction of the stopper.

The shift lever is provided with a bullet elastically operated, and the housing is formed with a fixing groove into which the bullet is inserted when the shift lever is in an undeployed location, and a groove disposed to be in contact with the bullet when the shift lever is in a deployed location and generating a sense of a shift operation as the bullet goes over the groove.

The shift lever apparatus further includes: a deceleration gear set composed of a first gear part installed on a rotating center axis of the shift lever to be rotated together with the shift lever, and a second gear part installed in the housing, and engaged with the first gear part to decelerate a rotation driving force of the first gear part.

The guide is formed in a circular shape having the same rotating center point as a rotating center axis of the shift lever, and provided with a rotating body which is connected to the stopper when the stopper is located in the second fixing hole to be rotated together with the shift lever therein.

The shift lever is formed to have a second end which surrounds the guide, and the sensing sensor is provided inside the guide to sense the movement of the rotating body to transfer a shift signal according to the rotating location of the shift lever.

A sensing gear is formed on the circumference of the rotating body, and the sensing sensor senses the movement of the sensing gear.

The second fixing hole of the guide is formed to accommodate a movement range of the stopper according to the upshifted or downshifted operation of the shift lever in a state where the stopper is inserted into the second fixing hole.

The operating mechanism includes: a release button provided on the first end of the shift lever and moved depending on whether the operation is performed, formed to extend from the first end to the second end of the shift lever, and elastically supported within the shift lever; and a release cam having one end connected to the release link, and another end connected to the stopper, and rotated in conjunction with the release button to move the stopper.

The release cam is rotated upon a drawn-into operation of the release button so that the stopper is separated from the first fixing hole or the second fixing hole.

The rotating body is coupled to the bullet elastically operated so as to be rotated together with the rotating body, and the guide is provided with a detent part which is disposed to be in contact with the bullet and is formed a groove over which the bullet goes upon rotation in a state where the shift lever is in the deployed location.

The shift lever is provided with a bullet elastically operated, and the housing is provided with an operation sense forming part which is formed to extend along a rotation radius of the bullet and formed with a groove on a contact surface of the bullet to generate a sense of the operation.

The shift lever apparatus having the aforementioned structure is simple in appearance (e.g., clean in design) as a lever for a specific mode that is normally hidden, and provides traveling sensitivity according to a driver's preference as the lever is deployed when the specific mode according to the driver's preference is required.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a shift lever apparatus according to a preferred exemplary embodiment of the present disclosure will be described with reference to the accompanying drawings.

Figure 1:
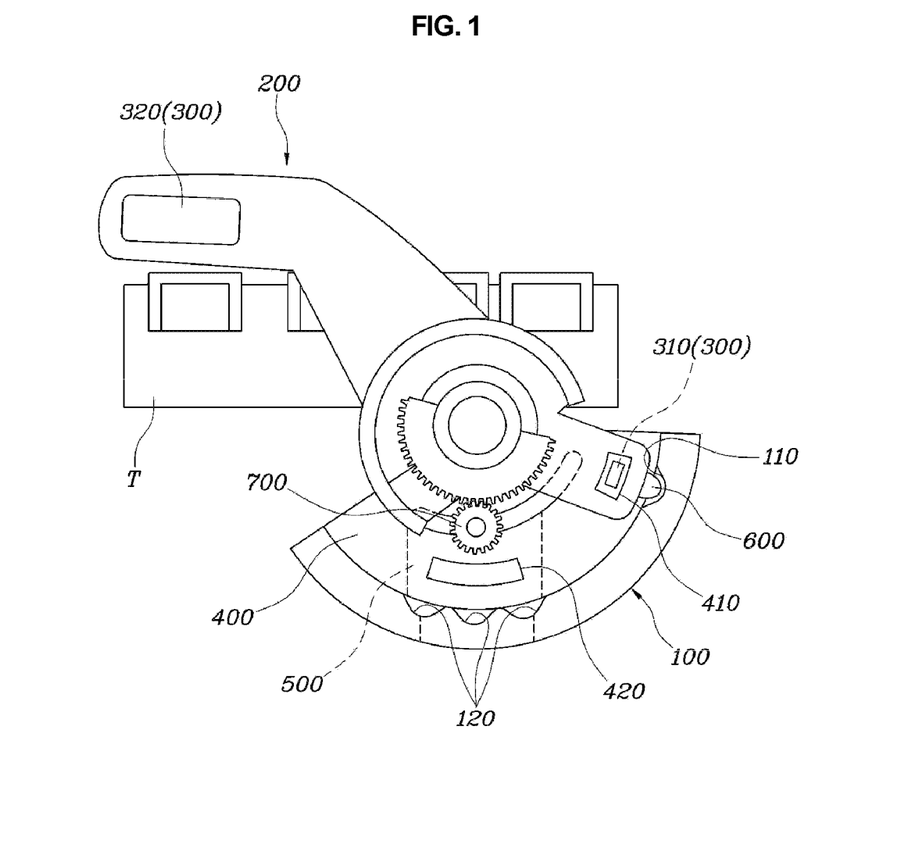
FIG. 1 is a diagram illustrating a shift lever apparatus according to an exemplary embodiment of the present disclosure.
Figure 8:
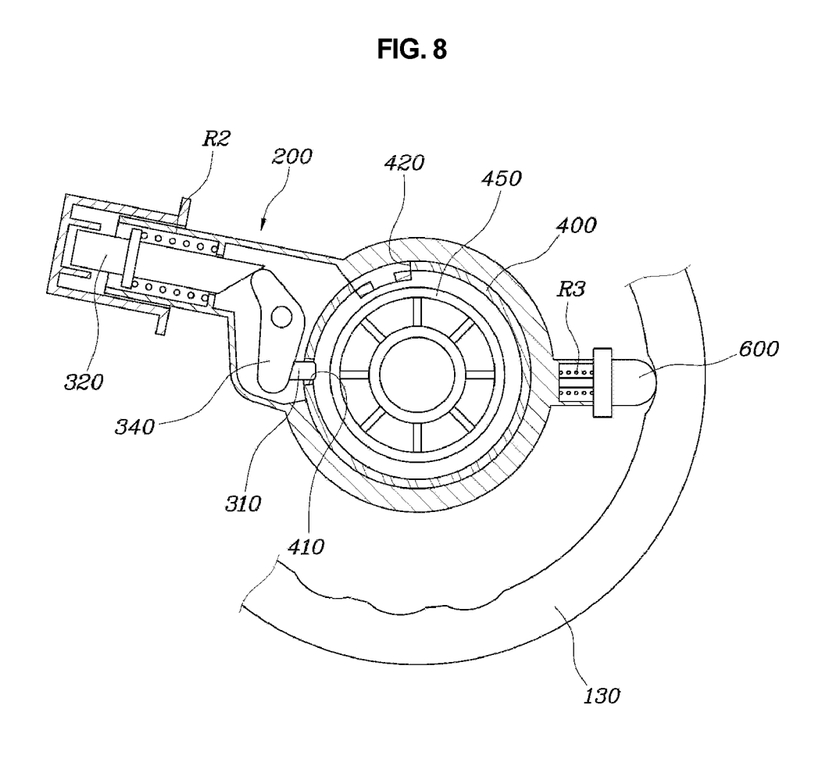
FIG. 8 is a diagram illustrating a shift lever apparatus according to another exemplary embodiment of the present disclosure.

FIG. 1 is a diagram illustrating a shift lever apparatus according to an exemplary embodiment of the present disclosure, FIGS. 2 to 7 are diagrams for explaining the shift lever apparatus illustrated in FIG. 1, and FIG. 8 is a diagram illustrating a shift lever apparatus according to another exemplary embodiment of the present disclosure.

Figure 2:
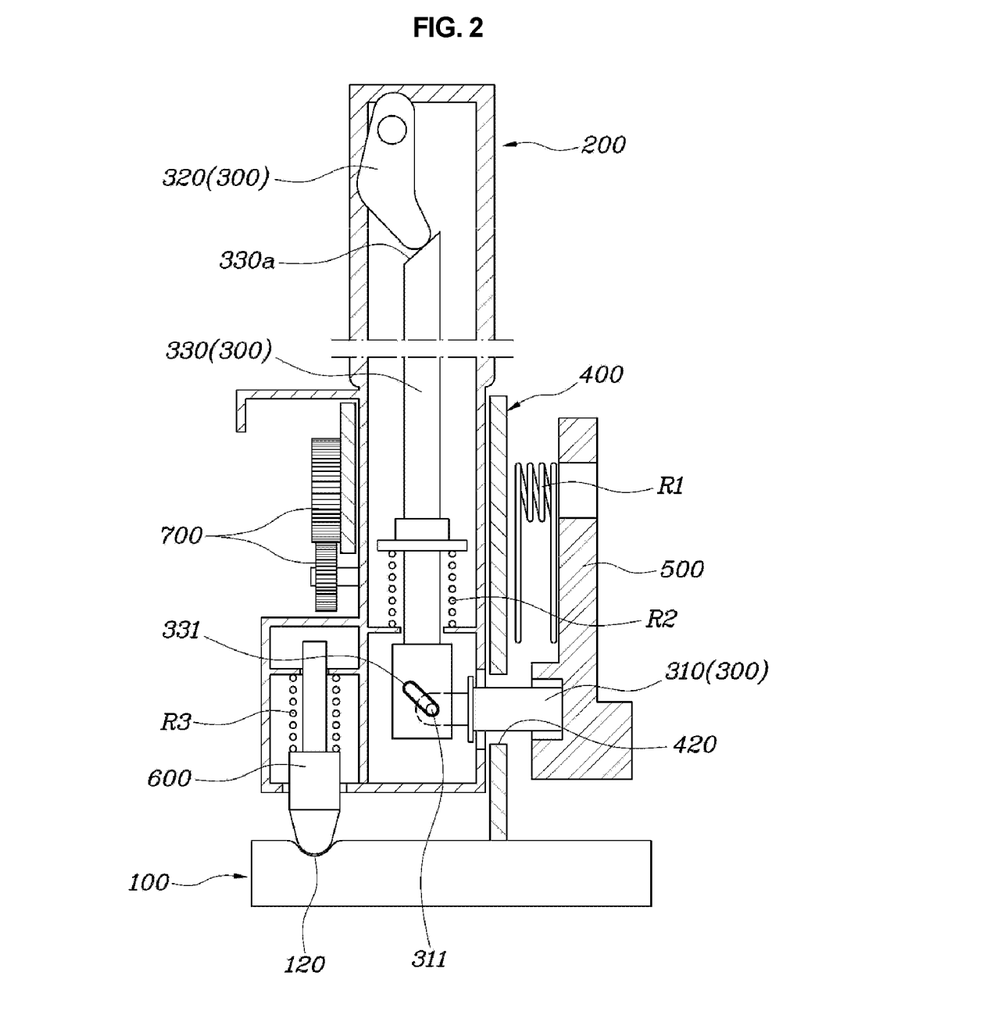
FIGS. 2 to 7 are diagrams for explaining the shift lever apparatus illustrated in FIG. 1.

As illustrated in FIGS. 1 and 2, the shift lever apparatus according to the present disclosure includes a shift lever 200 rotatably installed in a housing 100, and deployed or undeployed in the housing 100 according to a rotating location; an operating mechanism 300 installed on the shift lever 200, rotated together with the shift lever 200, and provided with a stopper 310 drawn out or drawn into the operating mechanism 300 depending on whether an operation is performed; a guide 400 installed in the housing 100 to guide the movement of the stopper 310, formed so that a first fixing hole 410 and a second fixing hole 420 are spaced apart from each other within a rotation radius of the stopper 310, the first fixing hole 410 being located so that the stopper 310 is inserted when the shift lever 200 is in an undeployed location, and the second fixing hole 420 being located so that the stopper 310 is inserted when the shift lever 200 is in a deployed location; and a sensing sensor 500 sensing the rotating location of the shift lever 200 when the stopper 310 is located in the second fixing hole 420 to transfer a shift signal according to the rotating location.

Here, the housing 100 may be installed on a console side of the vehicle, and the shift lever 200 is rotatably installed. The shift lever 200 according to the present disclosure is provided separately from a dial type or a button type shift operating unit T which controls an automatic shift stage, and may be used in a manual mode, thereby being formed in a lever type to provide sport-like performance. In addition, the shift lever 200 may also be used as a switch for changing various modes provided to the vehicle, such as an increase or decrease operation of the regenerative braking amount, and the setting of a traveling mode as well as a manual mode. In the following description of the present disclosure, it has been described that the operation is performed when the shift lever 200 is upshifted or downshifted in the manual mode.

The shift lever 200 is provided with the operating mechanism 300 so that the shift lever 200 is deployed or undeveloped depending on whether the operating mechanism 300 is operated. That is, the housing 100 is provided with the guide 400 guiding the movement of the stopper 310, and the guide 400 is formed with the first fixing hole 410 and the second fixing hole 420 for fixing the location of the stopper 310 when the stopper 310 is inserted. The guide 400 may be integrally configured in the housing 100. Particularly, the first fixing hole 410 and the second fixing hole 420 are spaced apart from each other, the first fixing hole 410 is located so that the stopper 310 is inserted when the shift lever 200 is in an undeployed location, and the second fixing hole 420 is located so that the shift lever 200 is inserted into the stopper 310 in the deployed location. Accordingly, if the stopper 310 is inserted into the first fixing hole 410 as the shift lever 200 maintains an initial location, the location is fixed in the undeveloped state, and if the stopper 310 is separated from the first fixing hole 410 and then the stopper 310 moves along the guide 400 by the rotation of the shift lever 200 to be inserted into the second fixing hole 420, the location of the shift lever 200 is fixed in a deployed state.

Particularly, when the stopper 310 is located in the second fixing hole 420, the shift stage according to the manual mode may be operated as the shift lever 200 is deployed. As described above, when the shift lever 200 is shifted by a driver's operation in a state where the shift stage in the manual mode may be operated, the sensing sensor 500 may sense the rotating location of the shift lever 200 to transfer a shift signal according to the rotating location. Here, the sensing sensor 500 may directly sense the rotating location of the shift lever 200 or sense the location of the stopper 310 to confirm a change in the shift stage.

The aforementioned present disclosure may be implemented in various exemplary embodiments.

As a first exemplary embodiment, as illustrated in FIGS. 1 and 2, the guide 400 is disposed at a side of the shift lever 200, and the sensing sensor 500 is disposed at a side facing the second fixing hole 420 of the guide 400, so that the stopper 310 may be inserted into the first fixing hole 410 or moved adjacently to the sensing sensor 500 through the second fixing hole 420 according to the rotating location of the shift lever 200. Here, each component including the guide 400 and the sensing sensor 500 may also be configured downward in addition to the side of the shift lever 200, thereby implementing the operating relationship between the respective components. However, since it is possible to reduce the layout by disposing the respective components including the guide 400 and the sensing sensor 500 at the side of the shift lever 200, and to simplify the structure, the respective components may be disposed at the side of the shift lever 200.

As illustrated in FIG. 2, as the guide 400 is disposed at the side of the shift lever 200, the shift lever 200 is rotatably installed on the guide 400. Here, the shift lever 200 needs to be configured to be returnable to an original location for the next operation after the operation. Accordingly, the sensing sensor 500 is mounted on the guide 400 through a return spring R1 so as to return to the original location, so that the shift lever 200 and the sensing sensor 500 may be moved together when the stopper 310 of the shift lever 200 is connected to the sensing sensor 500 through the second fixing hole 420 of the guide 400 and may return to the original location by an elastic force of the return spring R1. At this time, the sensing sensor 500 may confirm the location of the rotation of the shift lever 200 according to the movement of the stopper 310 in the state where the stopper 310 of the shift lever 200 is inserted. Separately, the shift lever 200 is also installed to be elastically returnable with respect to the guide 400, so that the location of the shift lever 200 may return to the original location.

Here, for the smooth assembly relationship between the respective components and the reduction in size, the shift lever 200 and the sensing sensor 500 may be installed on both sides around the guide 400, and the respective components may be integrally coupled to one hinge axis.

Figure 3:
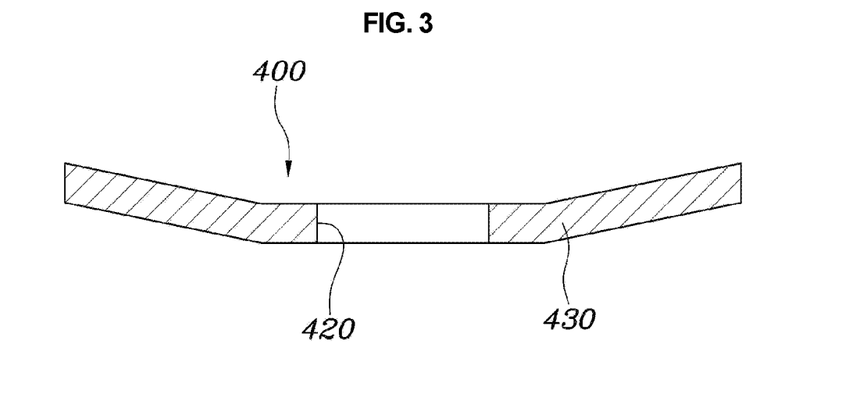
Figure 4:
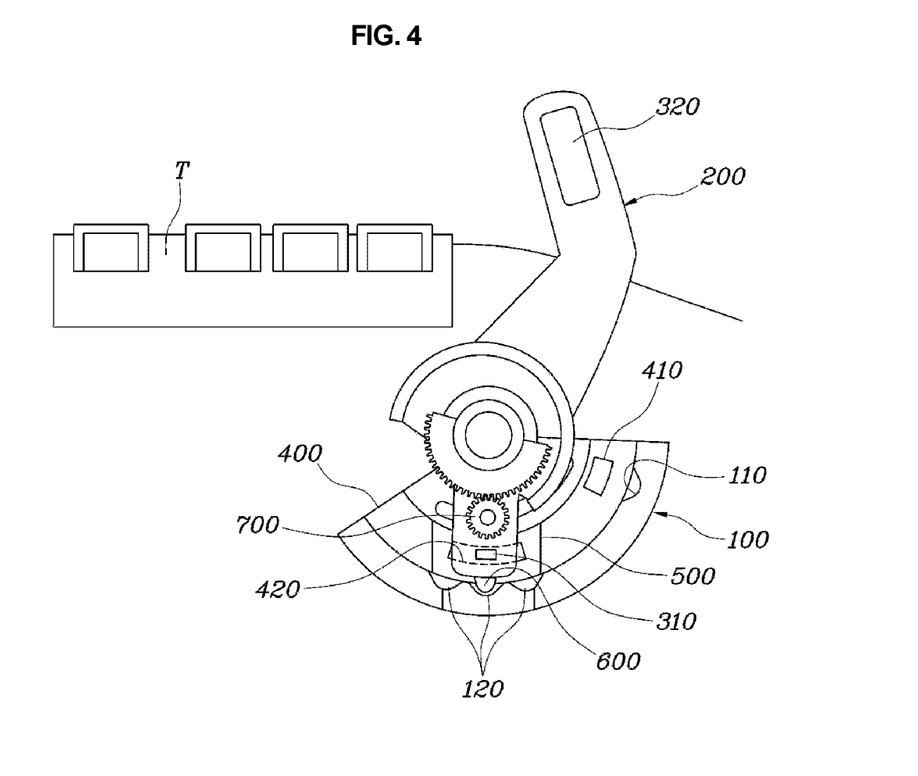

Meanwhile, as the guide 400 is formed so that a peripheral portion 430 of the second fixing hole 420 protrudes toward the sensing sensor 500, a contact portion of the stopper 310 may be formed to be inclined.

As illustrated in FIG. 3, the guide 400 is formed to be inclined as the peripheral portion 430 of the second fixing hole 420 protrudes, so that the stopper 310 may smoothly go over the inclined surface when being moved to the second fixing hole 420 along the guide 400.

That is, when the stopper 310 moves along the guide 400 from the first fixing hole 410 to the second fixing hole 420, a frictional force is generated. In particular, in the present disclosure, as the stopper 310 receives an elastic force by a release link 330 to be described below, friction with the guide 400 occurs upon movement. Accordingly, as the guide 400 is formed to be inclined by protruding the peripheral portion 430 of the second fixing hole 420, the frictional force may be decreased as the stopper 310 is moved to the second fixing hole 420, thereby smoothly performing the deployment of the shift lever 200. In addition, as the movement of the stopper 310 is induced to the second fixing hole 420, the stopper 310 may be accurately inserted into the second fixing hole 420, thereby preventing malfunction, and confirming the location of the shift stage through the sensing sensor 500 by naturally coupling the stopper 310 with the second fixing hole 420.

Meanwhile, the second fixing hole 420 of the guide 400 may be formed to accommodate a sensing range of the sensing sensor 500 according to the upshifted or downshifted operation of the shift lever 200 in the state where the stopper 310 is inserted into the second fixing hole 420. Here, the second fixing hole 420 may be formed to extend along the rotation radius of the stopper 310 as the shift lever 200 is rotated, and the shift lever 200 may extend in a length of accommodating the sensing range of the sensing sensor 500 according to the upshifted or downshifted operation. Accordingly, the shift lever 200 may perform the upshifted or downshifted operation, and the sensing sensor 500 may accurately confirm the shift location according to the rotation of the shift lever 200.

Meanwhile, as illustrated in FIG. 2, the operating mechanism 300 may be composed of a release button 320 provided on a first end of the shift lever 200 and moving depending on whether the operation is performed; and a release link 330 formed to extend from the first end to a second end of the shift lever 200, elastically supported within the shift lever 200, and having one end connected to the release button 320, and another end connected to the stopper 310, thereby moving the stopper 310 in conjunction with the release button 320.

That is, the operating mechanism 300 is composed of the release button 320, the release link 330, and the stopper 310, and when the operating force of the release button 320 is applied, the release link 330 and the stopper 310 may be interlocked with each other by the movement of the release button 320, thereby allowing or restricting the rotation of the shift lever 200. Here, the release link 330 may be elastically supported through the coil spring R2 within the shift lever 200 to return to the original location, and when the release link 330 returns, the release button 320 and the stopper 310 may be interlocked with each other to return to the original locations together.

In particular, the release button 320 is installed to be drawn out from or drawn into one end of the shift lever 200, and the release link 330 may have one end in contact with the release button 320 and be moved to the second end of the shift lever 200 upon a drawn-into operation of the release button 320, and may draw out the stopper 310 connected to the second end of the shift lever 200 so that the stopper 310 is separated from the first fixing hole 410 or the second fixing hole 420.

Here, the release button 320 may be configured to rotate at one end of the shift lever 200 for a sense of smooth operation. One end of the release link 330 is in contact with the release button 320 so as to be interlocked with the release button 320.

Accordingly, when the driver presses and draws into the release button 320, the release button 320 is moved to the second end of the shift lever 200 as one end of the release button 320 is pushed, and the stopper 310 connected to another end of the release button 320 is moved in conjunction with the movement of the release button 320, so that the stopper 310 may be separated from the first fixing hole 410 or the second fixing hole 420. Conversely, when the driver releases the pressing force of the release button 320, the release link 330 returns to the original location by a coil spring R2, so that the release button 320 and the stopper 310 return to the initial locations. At this time, the stopper 310 may be moved toward and inserted into the first fixing hole 410 or the second fixing hole 420.

One end of the aforementioned release link 330 is formed so that a portion 330a in contact with the release button 320 has an inclined surface to allow the interlocking operation between the release button 320 and the release link 330 to be performed smoothly. That is, when the release button 320 is rotated to press one end of the release link 330, a force is transferred in the form in which the release button 320 goes over the inclined surface of the release link 330, so that the release link 330 may be moved flexibly.

In addition, one end of the stopper 310 is provided with a guide pin 311, and another end of the release link 330 has an extension slit 331 into which the guide pin 311 is inserted and which may extend diagonally toward the drawn-into direction of the stopper 310. As illustrated in FIG. 2, in the stopper 310, as the guide pin 311 is inserted into the extension slit 331 of the release link 330, the stopper 310 and the release link 330 are connected to each other, the guide pin 311 is moved along the extension slit 331 when the release link 330 is moved, so that the stopper 310 may be moved. Here, the extension slit 331 is formed to extend diagonally toward the drawn-into direction of the stopper 310 so that the stopper 310 may be drawn out from the operating mechanism 300 when the release link 330 is moved to the second end of the shift lever 200. The extending direction of the extension slit 331 may be set depending on a direction in which the stopper 310 is to be drawn out or drawn into the operating mechanism 300 according to the movement of the release link 330.

Meanwhile, the shift lever 200 may be provided with a bullet 600 which is operated elastically, and the housing 100 may be formed with a fixing groove 110 into which the bullet 600 is inserted when the shift lever 200 is in the undeployed location, and a groove 120 disposed to be in contact with the bullet 600 when the shift lever 200 is in the deployed location and generating a sense of shift as the bullet 600 goes over the groove.

Here, the bullet 600 is elastically supported through an elastic spring R3 in the shift lever 200. Particularly, the undeployed location of the shift lever 200 may be fixed to the housing 100 when the bullet 600 is inserted into the fixing groove 110 as the fixing groove 110 into which the bullet 600 is inserted when the shift lever 200 is in the undeployed location is formed. In addition, the groove 120 in contact with the bullet 600 is formed in the housing 100 when the shift lever 200 is in the deployed location. The groove 120 is composed of a plurality of grooves corresponding to the neutral, upshift, and downshift of the shift stage so that a sense of a shift operation is generated upon the shift operation through the shift lever 200.

Accordingly, the undeployed location of the shift lever 200 is fixed when the bullet 600 is inserted into the fixing groove 110, and when operated, when the bullet 600 is separated from the fixing groove 110 and then moved to the groove 120, the shift by the shift operation of the shift lever 200 may be performed and a sense of shift operation may be provided.

Meanwhile, the shift lever 200 is connected to a deceleration gear part 700 provided in the housing 100, so that the rotating driving force of the shift lever 200 may be reduced by the deceleration gear part 700.

As illustrated in FIG. 2, the shift lever 200 and the housing 100 are connected to each other through the gear engagement of the deceleration gear part 700, respectively, so that the rotation driving force is reduced by the rotations of the respective gears configuring the deceleration gear part 700 when the shift lever 200 is rotated. Accordingly, when the driver operates the shift lever 200, the operating sensitivity is improved, and a sense of operation of the shift lever 200 is advanced.

Figure 5:
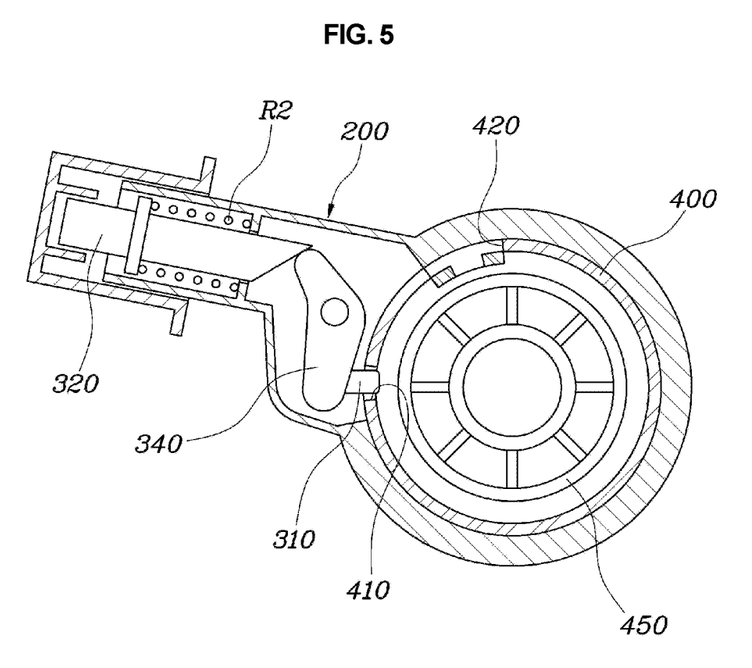
Figure 6:
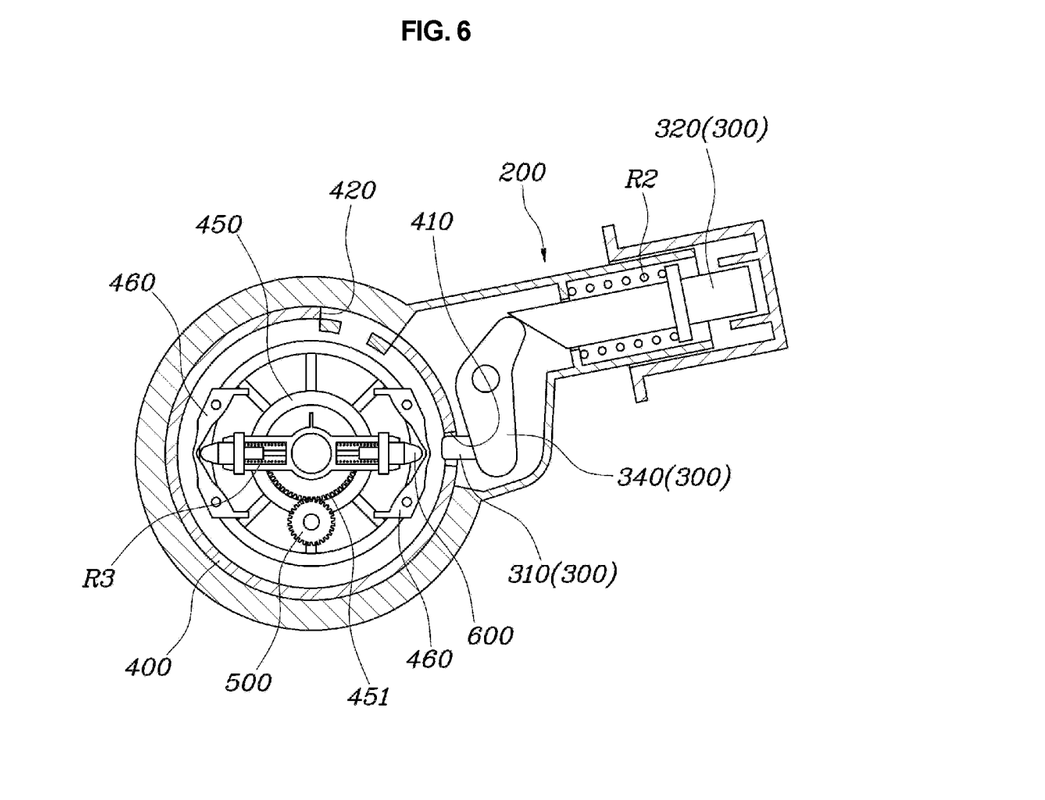
Figure 7:
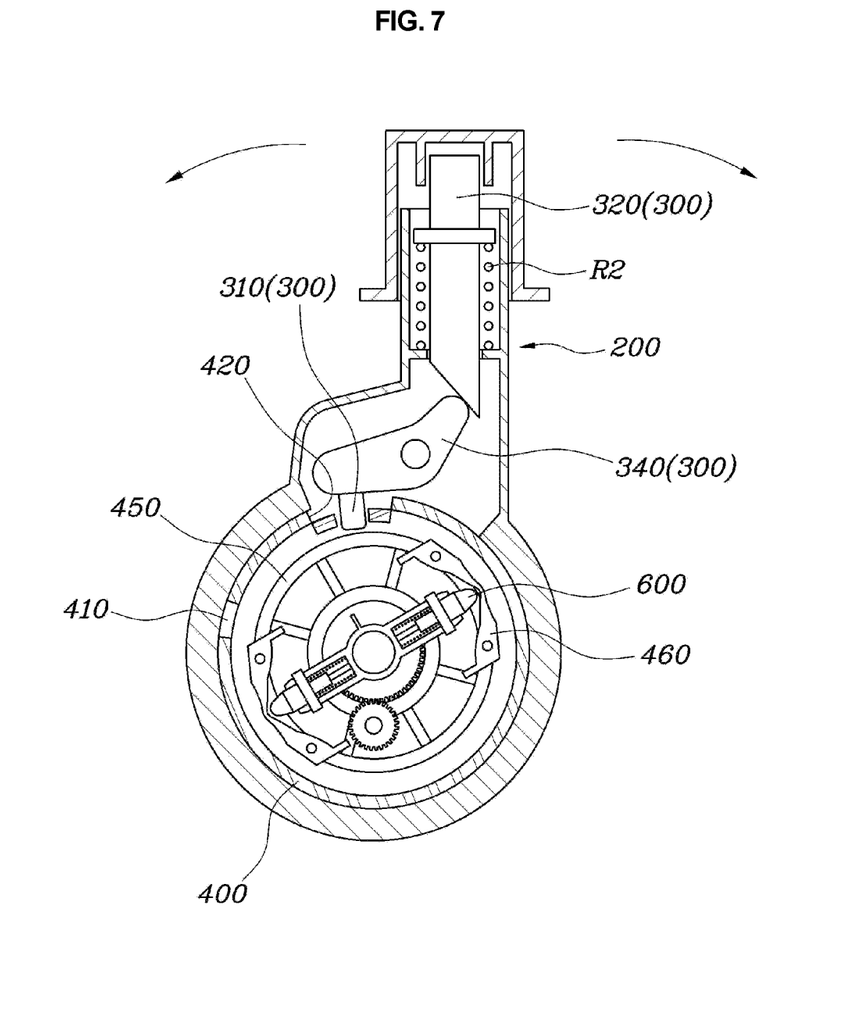

Meanwhile, as a second exemplary embodiment, as illustrated in FIGS. 5 and 6, the guide 400 is formed in a circular shape having the same rotating center point as the rotating center axis of the shift lever 200, and the interior of the guide 400 may be provided with a rotating body 450 which is connected to the stopper 310, when the stopper 310 is located in the second fixing hole 420, to be rotated together with the shift lever 200.

As described above, the guide 400 is formed in a circular shape, and as the shift lever 200 is formed to surround the guide 400, the shift lever 200 may be rotated through the guide 400. That is, the second end of the shift lever 200 is formed to surround the guide 400 and is not exposed inside the housing 100, and the first end of the shift lever 200 is exposed toward the driver to allow the shift lever 200 to be operated. As described above, the entire package is reduced in size by forming the structure in which the shift lever 200 surrounds the guide 400.

The interior of the guide 400 is provided with the rotating body 450 which is connected to the stopper 310 to be rotated together when the stopper 310 going over the shift lever 200 is located in the second fixing hole 420. The rotating body 450 has the same rotating center point as the rotating center axis of the shift lever 200 and is rotatably installed in the housing 100. Particularly, the rotating body 450 is connected to the stopper 310 when the stopper 310 is located in the second fixing hole 420 of the guide 400 and rotated in the same manner as the rotation of the shift lever 200. Here, the sensing sensor 500 may be provided inside the guide 400 to sense the movement of the rotating body 450 to sense the rotating location of the shift lever 200, and may transfer a shift signal generated therefrom. The rotating body 450 may also give a sense of operation in addition to providing information of the shift signal through the sensing sensor 500.

As illustrated in FIG. 6, a sensing gear 451 is formed around the rotating body 450, and the sensing sensor 500 may sense the movement of the sensing gear 451. That is, the sensing sensor 500 may be composed of a magnet sensor or a hall sensor, and sense the rotating location of the sensing gear 451 formed on the rotating body 450 to confirm the rotating location of the shift lever 200. The sensing sensor 500 may also provide a separate gear engaged with the sensing gear 451 of the rotating body 450 to confirm the rotating location of the shift lever 200 according to the amount of rotation of the gear.

Meanwhile, the second fixing hole 420 of the guide 400 may be formed to accommodate a movement range of the stopper 310 according to the upshifted or downshifted operation of the shift lever 200 in a state where the stopper 310 is inserted into the second fixing hole 420.

That is, the second fixing hole 420 may be formed to extend along the movement radius of the stopper 310 as the shift lever 200 is rotated, and may extend to a length which may accommodate the sensing range of the sensing sensor 500 according to the upshifted or downshifted operation of the shift lever 200. Accordingly, the shift lever 200 may perform an operation for upshift or downshift, and the sensing sensor 500 may accurately grasp the shift according to the rotation of the shift lever 200.

Meanwhile, the operating mechanism 300 may be composed of the release button 320 provided on the first end of the shift lever 200, moved depending on whether the operation is performed, formed to extend from the first end to the second end of the shift lever 200, and elastically supported within the shift lever 200; and a release cam 340 having one end connected to the release link 330, and another end connected to the stopper 310, and rotated in conjunction with the release button 320 to move the stopper 310. Here, the release cam 340 may be rotatably installed through a torsion spring so as to be returnable to the initial location.

That is, the operating mechanism 300 according to the second exemplary embodiment is composed of the release button 320 and the release cam 340 provided with the stopper 310, and when an operating force is applied to the release button 320, the release cam 340 is interlocked and rotated by the movement of the release button 320, so that the stopper 310 is moved. Here, the release button 320 may be elastically supported through the coil spring R2 within the shift lever 200 to return to the original location.

In particular, the release cam 340 may be rotated upon the drawn-into operation of the release button 320 so that the stopper 310 may be separated from the first fixing hole 410 or the second fixing hole 420. Here, the release button 320 may be configured to move in a direction of pushing the release cam 340 when a pressing operation is performed at the first end of the shift lever 200 for the smooth rotating operation of the release cam 340. Accordingly, when the driver presses and draws into the release button 320, the release button 320 is moved to the second end of the shift lever 200, and as the release cam 340 is pushed by the release button 320 to be rotated, the stopper 310 provided on the release cam 340 may be configured to be separated from the first fixing hole 410 or the second fixing hole 420. Conversely, when the driver releases the pressing force of the release button 320, the release button 320 returns to the original location by the coil spring R2 and the release cam 340 returns to the initial location. Here, since the release cam 340 returns to the original location through the torsion spring, the stopper 310 provided on the release cam 340 may be moved toward and inserted into the first fixing hole 410 or the second fixing hole 420.

Meanwhile, as illustrated in FIG. 6, the rotating body 450 is coupled to the bullet 600 elastically operated so as to be rotated together with the rotating body 450, and the guide 400 may be provided with a detent part 460 disposed to be in contact with the bullet 600 and formed with a groove over which the bullet 600 goes upon rotation in the state where the shift lever 200 is in the deployed location.

Here, the bullet 600 is elastically supported through an elastic spring R3 in the rotating body 450. The detent part 460 may be integrally configured on the guide 400, and separately installed on the guide 400. Particularly, the groove of the detent part 460 is formed of an inclined surface, a protrusion, or a groove so as to correspond to the neutral, upshift, and downshift of the shift stage, so that a sense of the shift operation is generated upon the shift operation through the shift lever 200. Accordingly, the shift lever 200 provides a sense of the shift operation when performing the shift operation in the state where the stopper 310 is located in the second fixing groove of the guide 400 and connected to the rotating body 450.

As another exemplary embodiment providing a sense of the shift operation of the shift lever 200, as illustrated in FIG. 8, the shift lever 200 is provided with the bullet 600 elastically operated, the housing 100 may be provided with an operation sense forming part 130 which is formed to extend along the rotating radius of the bullet 600, and has the groove formed in the contact surface of the bullet 600 to provide a sense of the operation.

As described above, the housing 100 is formed with the operation sense forming part 130 extending along the rotating radius of the bullet 600, and the bullet 600 provided on the shift lever 200 may be configured to go over the groove of the operation sense forming part 130, thereby forming a sense of the operation according to each situation at all locations at which the shift lever 200 is rotated. A sense of the operation of the shift lever 200 may be set by tuning and setting the groove shape of the operation sense forming part 130.

The shift lever apparatus having the aforementioned structure is clean in design as the lever for the specific mode is normally hidden, and provides the traveling sensitivity according to a driver's preference as the lever is deployed when the specific mode according to the driver's preference is required.

While the specific exemplary embodiments of the present disclosure have been illustrated and described, it will be apparent to those skilled in the art that various improvements and changes of the present disclosure are possible without departing from the technical spirit of the present disclosure provided by the appended claims.

What is claimed is:

1. A shift lever apparatus, comprising:
a shift lever rotatably installed in a housing, and deployed or undeployed in the housing according to a rotating location;
an operating mechanism installed on the shift lever to be rotated together with the shift lever, and provided with a stopper drawn out or drawn into the operating mechanism depending on whether an operation is performed;
a guide installed in the housing to guide movement of the stopper, formed so that a first fixing hole and a second fixing hole are spaced apart from each other within a rotating radius of the stopper, the first fixing hole being located so that the stopper is inserted when the shift lever is in an undeployed location, and the second fixing hole being located so that the stopper is inserted when the shift lever is in a deployed location; and
a sensing sensor sensing the rotating location of the shift lever when the stopper is located in the second fixing hole to transfer a shift signal according to the rotating location;
wherein the operating mechanism includes:
a release button provided on a first end of the shift lever and moved depending on whether the operation is performed; and
a release link formed to extend from the first end to a second end of the shift lever and elastically supported within the shift lever, and having the first end connected to the release button and the second end connected to the stopper, thereby moving the stopper in conjunction with the release button.

2. The shift lever apparatus according to claim 1,
wherein the release button is installed to be drawn out from or drawn into the first end of the shift lever, and
wherein the release link has one end in contact with the release button and is moved to the second end of the shift lever upon the drawn-into operation of the release button, and draws out the stopper connected to the second end of the shift lever so that the stopper is separated from the first fixing hole or the second fixing hole.

3. The shift lever apparatus according to claim 2,
wherein the release button is rotated or slid at the first end of the shift lever to be drawn out or drawn into the shift lever, and
wherein the one end of the release link is formed so that a portion in contact with the release button has an inclined surface.

4. The shift lever apparatus according to claim 2,
wherein one end of the stopper is provided with a guide pin, and
wherein another end of the release link has an extension slit, into which the guide pin is inserted, which extends diagonally toward a drawn-into direction of the stopper.

5. A shift lever apparatus, comprising:
a shift lever rotatably installed in a housing, and deployed or undeployed in the housing according to a rotating location;
an operating mechanism installed on the shift lever to be rotated together with the shift lever, and provided with a stopper drawn out or drawn into the operating mechanism depending on whether an operation is performed;
a guide installed in the housing to guide movement of the stopper, formed so that a first fixing hole and a second fixing hole are spaced apart from each other within a rotating radius of the stopper, the first fixing hole being located so that the stopper is inserted when the shift lever is in an undeployed location, and the second fixing hole being located so that the stopper is inserted when the shift lever is in a deployed location; and
a sensing sensor sensing the rotating location of the shift lever when the stopper is located in the second fixing hole to transfer a shift signal according to the rotating location,
wherein the guide is formed in a circular shape having the same rotating center point as a rotating center axis of the shift lever, and provided with a rotating body which is connected to the stopper when the stopper is located in the second fixing hole to be rotated together with the shift lever therein.

6. The shift lever apparatus according to claim 5, wherein the guide is disposed at a side of the shift lever, and the sensing sensor is disposed at a side facing the second fixing hole of the guide, so that the stopper is inserted into the first fixing hole or moved adjacently to the sensing sensor through the second fixing hole according to the rotating location of the shift lever.

7. The shift lever apparatus according to claim 6, wherein the guide is formed so that a peripheral portion of the second fixing hole protrudes toward the sensing sensor, and a contact portion of the stopper is formed to be inclined.

8. The shift lever apparatus according to claim 5, wherein the second fixing hole of the guide is formed to accommodate a sensing range of the sensing sensor according to an upshifted or downshifted operation of the shift lever in a state where the stopper is inserted into the second fixing hole.

9. The shift lever apparatus according to claim 5,
wherein the shift lever is provided with a bullet elastically operated, and
wherein the housing is formed with a fixing groove into which the bullet is inserted when the shift lever is in an undeployed location, and a groove disposed to be in contact with the bullet when the shift lever is in a deployed location and generating a sense of a shift operation as the bullet goes over the groove.

10. The shift lever apparatus according to claim 5, wherein the shift lever is connected to a deceleration gear part provided in the housing, so that a rotation driving force of the shift lever is decelerated by the deceleration gear part.

11. The shift lever apparatus according to claim 5,
wherein the shift lever is formed to have a second end which surrounds the guide, and
wherein the sensing sensor is provided inside the guide to sense movement of the rotating body to transfer a shift signal according to the rotating location of the shift lever.

12. The shift lever apparatus according to claim 11,
wherein a sensing gear is formed on the circumference of the rotating body, and
wherein the sensing sensor senses the movement of the sensing gear.

13. The shift lever apparatus according to claim 5, wherein the second fixing hole of the guide is formed to accommodate a movement range of the stopper according to the upshifted or downshifted operation of the shift lever in a state where the stopper is inserted into the second fixing hole.

14. The shift lever apparatus according to claim 5, wherein the operating mechanism comprises:
a release button provided on a first end of the shift lever and moved depending on whether the operation is performed, formed to extend from a first end to a second end of the shift lever, and elastically supported within the shift lever; and a release cam having one end connected to the release link, and another end connected to the stopper, and rotated in conjunction with the release button to move the stopper.

15. The shift lever apparatus according to claim 14, wherein the release cam is rotated upon a drawn-into operation of the release button so that the stopper is separated from the first fixing hole or the second fixing hole.

16. The shift lever apparatus according to claim 5, wherein the rotating body is coupled to the bullet elastically operated so as to be rotated together with the rotating body, and wherein the guide is provided with a detent part which is disposed to be in contact with the bullet and formed with a groove over which the bullet goes upon rotation in a state where the shift lever is in the deployed location.

17. The shift lever apparatus according to claim 5, wherein the shift lever is provided with a bullet elastically operated, and wherein the housing is provided with an operation sense forming part which is formed to extend along a rotation radius of the bullet and formed with a groove on a contact surface of the bullet to generate a sense of the operation.

* * * * *